United States Patent
Myers (10) Patent No.: US 9,021,987 B1
(45) Date of Patent: May 5, 2015

(54) VERTICALLY INTEGRATED AQUACULTURE SYSTEM

(75) Inventor: Gary Myers, Sartell, MN (US)

(73) Assignees: Aquama of Aquaculture Technologies, Ltd, Rosh Ha'Ayin (IL); Dakota Fisheries, Inc., Phillip, SD (US)

( * ) Notice: Subject to any disclaimer, the term of this patent is extended or adjusted under 35 U.S.C. 154(b) by 288 days.

(21) Appl. No.: 12/569,886

(22) Filed: Sep. 29, 2009

(51) Int. Cl.
A22C 25/14 (2006.01)
A01K 61/00 (2006.01)

(52) U.S. Cl.
CPC .................................. *A01K 61/00* (2013.01)

(58) Field of Classification Search
CPC ....... A01K 61/00; A01K 67/00; A01K 79/00; A01K 79/02; A22C 25/00; A22C 25/08; A22C 25/14; A22C 25/16; A22C 25/17; A22C 25/18
USPC ......... 119/213, 215, 216, 225, 226, 230, 224, 119/200; 452/57, 64, 121, 161, 198; 47/1.4
See application file for complete search history.

(56) References Cited

U.S. PATENT DOCUMENTS

| | | | |
|---|---|---|---|
| 1,909,578 A | | 5/1933 | Franke |
| 2,208,645 A | * | 7/1940 | Savrda ........................ 452/170 |
| 2,358,320 A | * | 9/1944 | Eisaman ...................... 424/442 |
| 2,825,541 A | | 3/1958 | Molle et al. |
| 2,871,820 A | | 2/1959 | Hayden |
| 3,189,334 A | | 6/1965 | Bell |
| 3,309,730 A | * | 3/1967 | Johannes ..................... 452/153 |
| 3,364,514 A | * | 1/1968 | Hartl et al. .................. 452/180 |
| 3,496,901 A | | 2/1970 | Stanfield |
| 3,717,123 A | | 2/1973 | Regnier |
| 3,760,767 A | | 9/1973 | Hickey |
| 3,873,734 A | * | 3/1975 | Higgins et al. ................ 426/69 |
| 3,886,902 A | | 6/1975 | Haynes |
| 3,994,807 A | | 11/1976 | Macklem |
| 4,043,299 A | | 8/1977 | Birkbeck et al. |
| 4,052,960 A | | 10/1977 | Birkbeck et al. |
| 4,271,099 A | | 6/1981 | Kukla |
| 4,587,064 A | | 5/1986 | Blum |
| 4,654,147 A | | 3/1987 | Bagley |
| 4,853,124 A | | 8/1989 | Terada |
| 4,861,465 A | | 8/1989 | Augustyniak |
| 4,894,149 A | | 1/1990 | Block |
| 4,906,359 A | | 3/1990 | Cox, Jr. |
| 4,935,250 A | * | 6/1990 | Cox ................................ 426/94 |
| 5,062,951 A | | 11/1991 | Tominaga |
| 5,081,954 A | | 1/1992 | Monus |
| 5,122,266 A | | 6/1992 | Kent |
| 5,139,659 A | | 8/1992 | Scott |

(Continued)

FOREIGN PATENT DOCUMENTS

WO    WO 2008148155 A1 * 12/2008 ............... A22B 3/08

*Primary Examiner* — Monica Williams
*Assistant Examiner* — Joshua Huson
(74) *Attorney, Agent, or Firm* — Mark A. Ekse (57) ABSTRACT

A Vertically Integrated Aquaculture System for producing high quality consumer seafood products at a significantly reduced cost. The Vertically Integrated Aquaculture System includes at least one aquaculture grow-out module for containing an aquaculture species, a feed handling system for distributing feed to the aquaculture species located in the aquaculture grow-out module(s), an aquaculture species moving system for routing the aquaculture species at least out of the aquaculture grow-out module(s), and a processing system for processing the aquaculture species after harvesting from the aquaculture grow-out module(s).

40 Claims, 6 Drawing Sheets

(56) References Cited

U.S. PATENT DOCUMENTS

| | | | |
|---|---|---|---|
| 5,149,298 A * | 9/1992 | Lindee | 452/174 |
| 5,205,237 A | 4/1993 | Skeggs et al. | |
| 5,593,574 A * | 1/1997 | VanToever | 210/150 |
| 5,732,654 A | 3/1998 | Perez et al. | |
| 5,961,831 A | 10/1999 | Lee et al. | |
| 6,041,738 A * | 3/2000 | Hemauer et al. | 119/226 |
| 6,210,262 B1 * | 4/2001 | Burch et al. | 452/99 |
| 6,322,437 B1 * | 11/2001 | Grabau et al. | 452/161 |
| 6,382,134 B1 | 5/2002 | Gruenberg et al. | |
| 6,499,431 B1 * | 12/2002 | Lin et al. | 119/226 |
| 6,722,314 B1 | 4/2004 | Crisinel et al. | |
| 7,220,177 B2 * | 5/2007 | King et al. | 452/62 |
| 2002/0112671 A1 * | 8/2002 | Patterson et al. | 119/230 |
| 2004/0025803 A1 * | 2/2004 | Sherrill et al. | 119/710 |
| 2004/0107914 A1 * | 6/2004 | Untermeyer et al. | 119/215 |
| 2005/0276881 A1 * | 12/2005 | Chen et al. | 426/2 |
| 2006/0154586 A1 * | 7/2006 | Goto | 452/81 |
| 2006/0204640 A1 * | 9/2006 | Mizuguchi et al. | 426/643 |
| 2008/0035070 A1 * | 2/2008 | Harrison et al. | 119/223 |
| 2009/0050067 A1 * | 2/2009 | Parsons et al. | 119/200 |
| 2009/0156109 A1 * | 6/2009 | Goodrick | 452/57 |
| 2009/0159010 A1 * | 6/2009 | Spartz | 119/200 |
| 2009/0181126 A1 * | 7/2009 | Wicking et al. | 426/61 |
| 2010/0081835 A1 * | 4/2010 | Wu et al. | 554/8 |

* cited by examiner

VERTICALLY INTEGRATED AQUACULTURE SYSTEM

BACKGROUND OF THE INVENTION

1. Field of the Invention

The present invention relates to aquaculture and more particularly pertains to a new Vertically Integrated Aquaculture System for producing high quality consumer seafood products at a significantly reduced cost.

2. Description of the Prior Art

The use of aquaculture is known in the prior art. More specifically, aquaculture heretofore devised and utilized are known to consist basically of familiar, expected and obvious structural configurations, notwithstanding the myriad of designs encompassed by the crowded prior art which have been developed for the fulfillment of countless objectives and requirements.

In many instances, open ponds and flow-through systems are used limiting the geographic locations available for production, as well as placing the stock being raised at increase risk for health and environmental concerns.

In these respects, the Vertically Integrated Aquaculture System according to the present invention substantially departs from the conventional concepts and designs of the prior art, and in so doing provides an apparatus primarily developed for the purpose of producing high quality consumer seafood products at a significantly reduced cost.

SUMMARY OF THE INVENTION

In view of the foregoing disadvantages inherent in the known types of aquaculture now present in the prior art, the present invention provides a new Vertically Integrated Aquaculture System construction wherein the same can be utilized for producing high quality consumer seafood products at a significantly reduced cost.

To attain this, the present invention generally comprises at least one aquaculture grow-out module for containing an aquaculture species, a feed handling system for distributing feed to the aquaculture species located in the aquaculture grow-out module(s), an aquaculture species moving system for routing the aquaculture species at least out of the aquaculture grow-out module(s), and a processing system for processing the aquaculture species after harvesting from the aquaculture grow-out module(s).

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the degree of quality control available during the grow-out process due to the aquaculture grow-out modules being positioned inside a structure. Additionally, this configuration allows non-traditional aquaculture environments (plains, deserts, etc.) to be used in aquaculture production.

Another significant advantage of the present invention is the high utilization of traditional waste products as further value added products of the system.

Still another significant advantage is the on-site customization of feed for use in the grow-out process to accommodate the immediate needs of the aquaculture species throughout the grow-out process.

Yet another significant advantage is the significant reduction of food miles associated with the end product.

"Food Miles" is a term which generally refers to the distance food is transported from the time of its production until it reaches the consumer; sometimes referred to as "farm to plate". This metric can be used as one dimension in assessing the environmental impact of food. Some estimates have placed the average food miles to be between 1500 and 2000 miles. It is easy to appreciate the miles travelled by a Washington state apple being delivered to Sioux Falls, S. Dak. (Approximately 1500 miles), or to Ft. Lauderdale, Fla. (Approximately 3300 miles). When a food is more complex, the miles traveled by the ingredients to the plant for processing and then to the consumer should be considered.

As an example, consider the production of livestock. The feed, often grains, is raised on a farm and harvested. It is not unusual, for the grain to be transported to a large market for sale, and then transported from the market to the livestock producers. The grain is then fed to the livestock which are then in turn transported to a stockyard and sold to a meat processor. The processor then processes the livestock into a food product which is then routed to a wholesaler and then to a retailer for purchase to the consumer. In this case it is not just the miles traveled by the finished food product, which should be included in the food miles metric, but also the miles travelled by the grain which went into producing the livestock, and the miles travelled by the livestock which went into producing the food product.

Another dimension in assessing the environmental impact of a food is the waste products created during the production of the food and how these waste products may be disposed. Ideally waste products could be returned to the environment without negative impact.

In at least one embodiment of the present invention, both the overall food miles and the environmental impact of the waste products are greatly reduced, and thus the negative environmental impact of the production process is also greatly reduced.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given

DESCRIPTION OF PREFERRED EMBODIMENTS

With reference now to the drawings, and in particular to FIGS. 1 through 6 thereof, a new Vertically Integrated Aquaculture System embodying the principles and concepts of the present invention and generally designated by the reference numeral 10 will be described.

The present invention may be described as a highly integrated aquaculture production system, as illustrated in FIGS. 1 through 6. In at least one embodiment, the system includes a collocated feed mill for storing and processing grains into feed, grow-out facilities for at least one aquaculture species, and a processing center for processing the aquaculture species into one or more final product, thereby significantly reducing the food miles associated with the final product.

At least one preferred embodiment of the present invention is disclosed in the following several paragraphs. It is to be understood that alternate embodiments may provide cost, speed, and/or environmental benefits in particular settings. Additionally, as each of the components of the present invention are described, it should not be assumed that specific limitations of other components are required, unless specifically stated. Further, reference to any particular aquaculture species should not be assumed to limit or restrict the system from applications with other aquaculture species.

Figure 2:
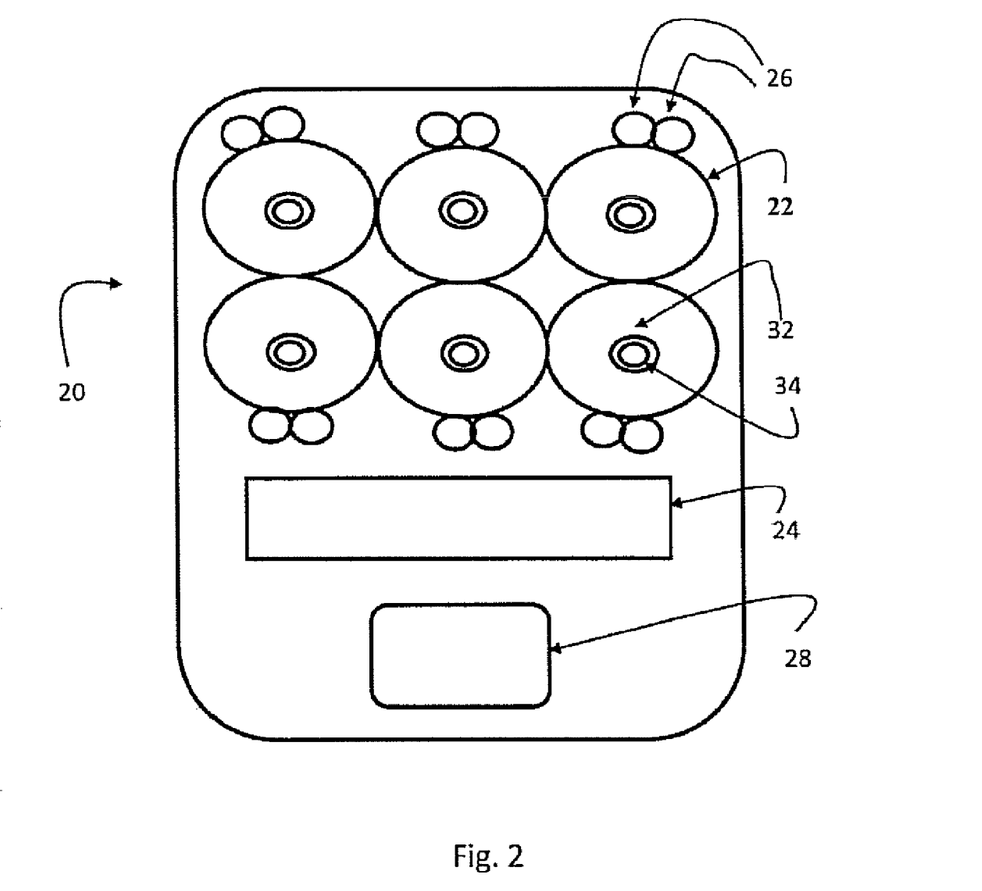
FIG. 2 is a schematic block diagram of the aquaculture grow-out modules of a preferred embodiment of the present invention.

In an embodiment each aquaculture grow-out module 20 further may include a plurality of holding tanks 22 and a treatment system 24. Each one of the holding tanks 22 may hold between 50,000 and 800,000 gallons. The size of each one of the holding tanks 22 may be determined at least in part by the intended aquaculture species to be grown in the holding tank. As an illustrative example, in the case of raising tilapia, it is preferred, although not required, that each one of the holding tanks 22 holds approximately 200,000 gallons and has a diameter of approximately 60 feet and a depth of approximately 10 feet. As a further illustrative example, in the case of raising salmon, it is preferred, although not required that each one of the holding tanks 22 be approximately 80 to 85 feet in diameter and approximately 20 feet deep. Each one of the plurality of holding tanks 22 is for at least temporarily holding a quantity of production water and a quantity of the aquaculture species during the grow-out process. It is important to note, that during production the volume referenced for the holding tanks 22 includes both production water and the aquaculture species.

The treatment system 24 is operationally coupled to the plurality of holding tanks 22 and at least partially removes waste from the production water. The waste removal may be performed through settling, mechanical filtering, biological action, or a combination thereof.

In an embodiment the quantity of the aquaculture species may include a quantity of fish, and the quantity of fish held in at least one of the plurality of holding tanks 22 is between 0.3 pounds of fish per gallon of production water to 6 pounds of fish per gallon of water. As illustrative examples only, and not for purposes of limiting the number, type, or characteristics of the aquaculture species which may be produced it is anticipated that at the start of each stage of the grow-out process for tilapia, a density of between 0.25 and 1.0 pounds of fish per gallon of production water will be used with an end-of stage density of between 0.75 and 1.5 pounds of fish per gallon. More preferably for tilapia a start of stage density 0.5 pounds of fish per gallon of production water will be used with an end-of stage density target of 0.875 pounds of fish per gallon. By way of contrast, an end of stage density for an aquaculture species such as African catfish may be between 3.5 and 5 pounds of fish per gallon of production water.

In at least one embodiment the density of fish per gallon of water at least partially inhibits reproduction of the fish being held in the holding tanks 22 reducing or eliminating the requirement to use hormones to inhibit reproduction. The reduction or elimination of hormones during the production process has the additional advantage of providing a potentially more desirable product for the consumer.

The system may include an oxygen dissolving system 26 for at least partially controlling a level of oxygen in the quantity of production water.

In an embodiment each aquaculture grow-out module 20 further may include 2 to 10 holding tanks 22. More preferably, each module includes six holding tanks 22.

In at least one preferred embodiment, the system includes a heating system 28 operationally coupled to the aquaculture grow-out module 20s. Some aquaculture species, such as by way of example and not limitation, tilapia require warm water for efficient grow-out and health of the species. Providing heat to the aquaculture grow-out module 20s allows for non-traditional climates to be used for aquaculture. In at least one embodiment, geothermal water is used as at least a portion of the heating system 28.

In a further embodiment each one of the plurality of holding tanks 22 further includes a central drain assembly 30 positioned substantially in a center portion of each one of the holding tanks 22. The central drain assembly 30 preferably has a first portion 32 designed for draining waste in a predominately liquid form for direction into the treatment system 24. The central drain assembly 30 may also include a second portion 34 designed for removing waste solids from the holding tank for direction into the treatment system 24, and alternately directly into the waste discharge pond of the treatment system 24.

In a preferred embodiment the treatment system 24 directs waste from the plurality of holding tanks 22 to a first pond 36 which maybe held in substantially aerobic conditions for use in fertigation.

In a further preferred embodiment the treatment system 24 also screens out a portion of waste solids and directs the waste solids to a holding pond 38 to be used as fertilizer in a traditional land application.

Figure 6:
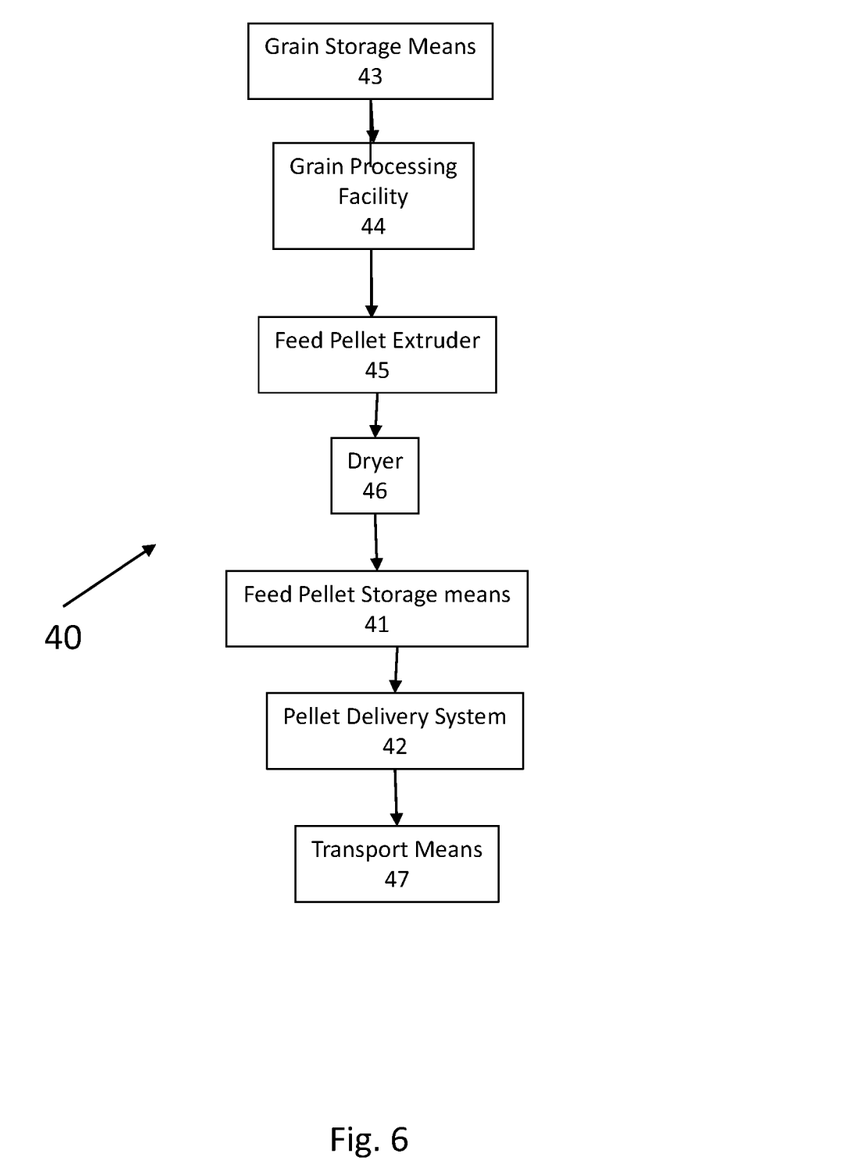
FIG. 6 is a schematic block diagram of the feed handling system of the present invention.

In a typical embodiment the feed handling system 40 may include a feed pellet storage means 41 and a pellet delivery system 42. The feed pellet storage means 41 is for temporarily storing feed pellets to be fed to the aquaculture species, and may take the form of a bin, silo, interior pile, or the like. The pellet delivery system 42 routes feed pellets from the feed pellet storage means 41 to the aquaculture grow-out module 20s. This may be directed to a central location for each aquaculture grow-out module 20 or direct to each holding tank.

Preferably, the aquaculture system may include a grain storage means 43 and a grain processing facility 44. The grains stored and processed may be soybean meal, whole soybeans, wheat, wheat midlings, corn, peas, canola meal, and dried distiller's grains (wet or dry). Kelp or other feed components may also be added to boost DHA (docosahexaenoic acid) content.

In an embodiment the grain processing facility 44 further may include a feed pellet extruder 45 for forming a quantity of feed pellets into a selected size and shape. The feed pellet extruder 45 selectively forms pellets with a diameter between 0.05 inches and 0.5 inches inclusive. For small fish a $\frac{1}{16}^{th}$ inch diameter is preferred. As the fish reach the final stages of the grow-out process the preferred pellet size increases incrementally to larger diameters. Again as an illustrative example, in the case of raising tilapia, the larger diameter pellet size for the final stages of the grow-out may be approximately $\frac{3}{16}^{th}$ inch diameter.

In at least one embodiment air is incorporated into the feed pellets after extrusion to improve the characteristic of the feed pellets to float.

In a further embodiment the feed pellets may be formulated to include between 5 and 25 percent fat, between 25 and 50% protein, and the remainder carbohydrate and minerals. Typically a higher protein formulation is desired for smaller fish, and a lower protein formulation is desired for larger fish.

Additionally, in at least one embodiment fish or vegetable oil is applied to the feed pellets after extrusion to enhance the taste of the pellets for the aquaculture species. Further, the application of fish or vegetable oil reduces dust created during pellet handling and transport.

In at least one embodiment, the grain processing facility 44 also includes a dryer 46 for drying a quantity of feed pellets after extrusion using thermal energy. Waste thermal energy from the dryer 46 is directed to the grow-out modules 20 for heating water used in the grow-out modules 20, through the use of a conventional heat exchanger or other similar method.

The pellet delivery system 42 utilizes a transport means 47 such as wheeled transport, conveyor, pneumatic, cable, chain, and auger systems.

Figure 1:
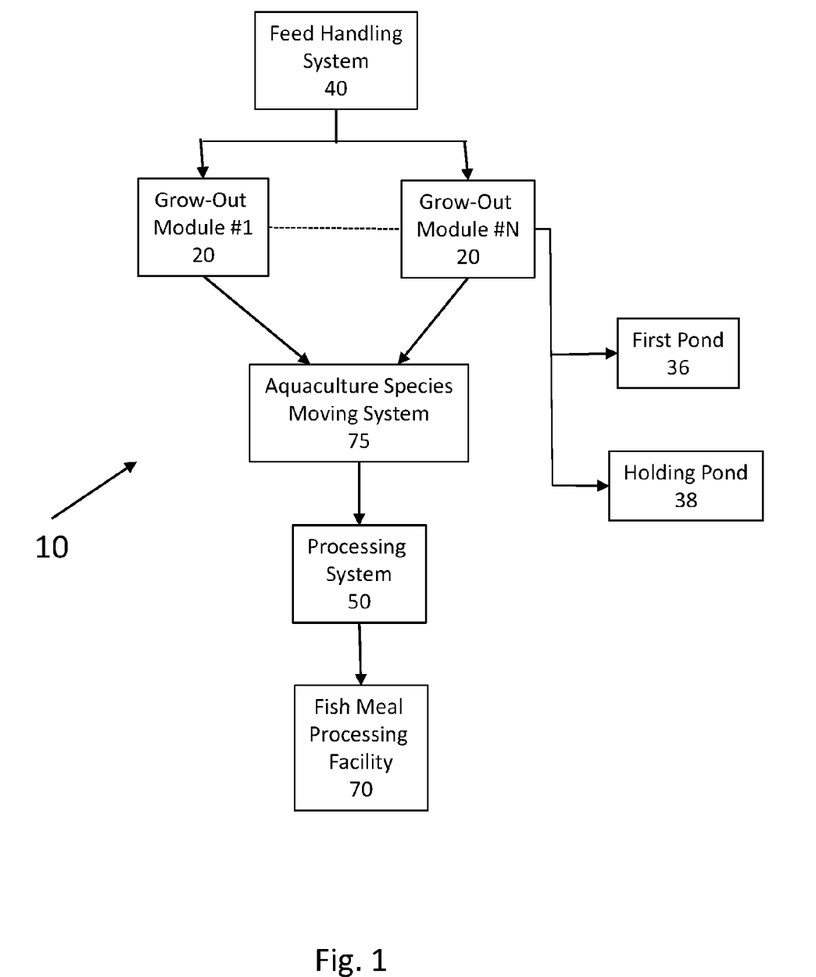
FIG. 1 is a schematic functional block diagram of a new Vertically Integrated Aquaculture System according to an embodiment of the present invention.

While the specific timing and number of stages during the grow-out process is species dependent, an illustrative example of the grow-out process for fish is as follows: A quantity of fingerlings are placed in a first one of the holding tanks 22. The production water placed in the tank is at least periodically filtered and the fingerlings are at least periodically fed. As the fingerlings grow they are sized and when they have reached a target weight the quantity of fish is divided and placed in at least two holding tanks 22 to allow room for further grow-out. This process is repeated until the fish reach a production target weight, at which time they are then routed via the aquaculture species moving system 75 to the processing system 50. The aquaculture species moving system 75 may also be used to route the species between tanks throughout the grow-out process.

After harvesting, the harvested species are directed alive to the processing system 50 via the aquaculture species moving system 75. Preferably the processing system 50 includes a primary processing facility 51 and a secondary processing facility 58. These facilities may be collocated.

Although many different embodiments and configurations of the processing system 50 are anticipated by the present invention, a typical facility is described in the next several paragraphs below for purposes of illustration.

Figure 3:
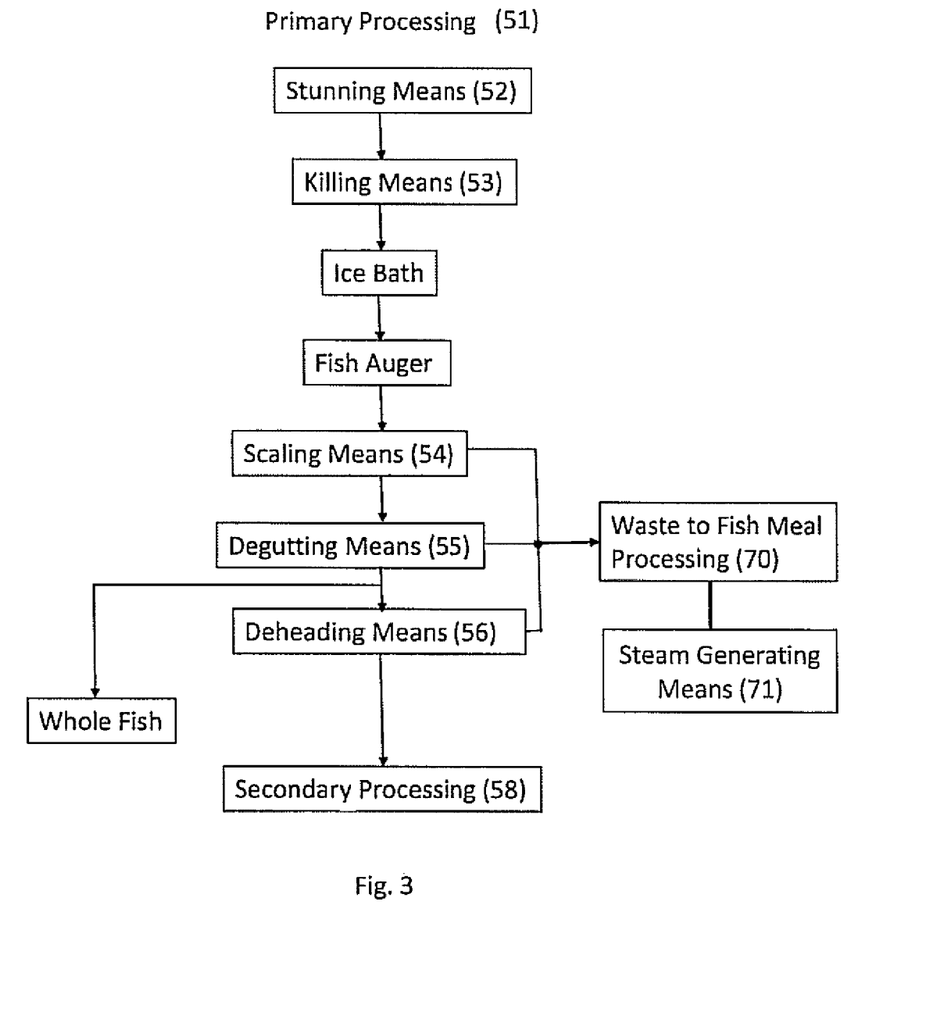
FIG. 3 is a schematic functional flow diagram of the primary processing facility of the present invention.

Typically the live species are directed to a stunning means 52 for stunning the aquaculture species prior to further processing. The stunning means 52 may be an ice bath, electric shock, or other appropriate method.

After stunning the species are generally killed by being bled. This may be accomplished by a killing means 53. The killing means 53 may be a knife cut across the bottom of the gill and downward. This may be done by machine or by hand. After being bled, the species is placed into a second ice bath. The blood is preferably collected for later processing into fish meal.

It is important to note that some aquaculture species, such as algae, do not need to be stunned or killed prior to processing.

The species are then preferably moved from the ice bath to be scaled. This may be accomplished via fish auger. The species is preferably scaled by machine, but can be hand scaled. The scales are preferably collected for later processing into fish meal or other commercial uses.

After scaling, the species is typically degutted. The degutting means 55 is preferably a machine, but the species can be gutted by hand. The guts pare preferably collected for later processing into fish meal.

After being degutted the species may be routed for packaging as a whole fish. If the species is selected for packaging as a whole fish, it is anticipated that the net weight of the processed whole fish will be greater than 80% of the total weight of the live fish.

Alternately, the species can be deheaded. Preferably the deheading means 56 is a machine, but the species can be deheaded by hand. Preferably the heads are collected for later processing into fish meal.

At this point the primary processing is substantially complete, with the primary output being a "clean fish" or species carcass, which is next routed to secondary processing.

Figure 4:
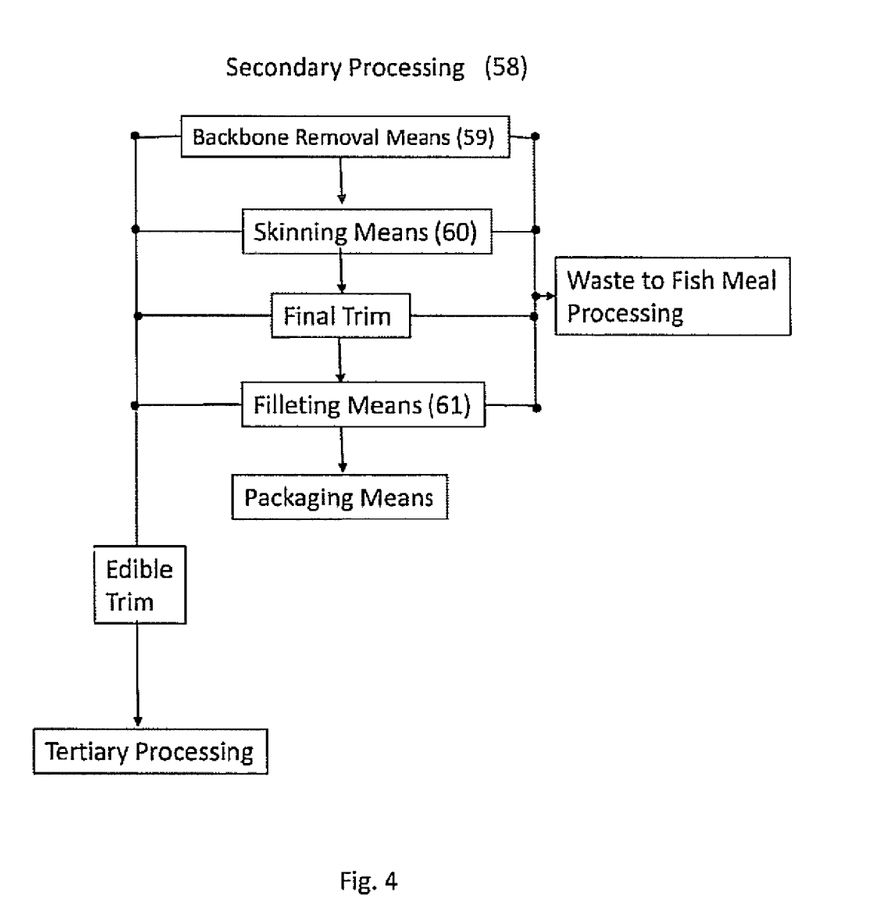
FIG. 4 is a schematic functional flow diagram of the secondary processing facility of the present invention.

The secondary processing facility 58 a backbone removal means 59 for removing the backbones of the aquaculture species. The removed backbones generally including some flesh, bones, and ribs. The backbones serving as an input to a fish meal processing facility 70. The flesh from the removed backbones is collected as edible trim for tertiary processing.

After removal of the backbone, the species carcass may be routed to the skinning means 60 for selectively removing the skin. Preferably the skinning means 60 is a machine. The removed skins may be used as an input for the fish meal processing facility 70, for making gelatin, or for making leather.

The species carcass is then directed to the filleting means 61 for cutting fillets from the preprocessed aquaculture species carcass. In an embodiment remaining flesh not part of the fillets is collected as edible trim for tertiary processing. The filleting means 61 may be a machine or by hand operation.

Figure 5:
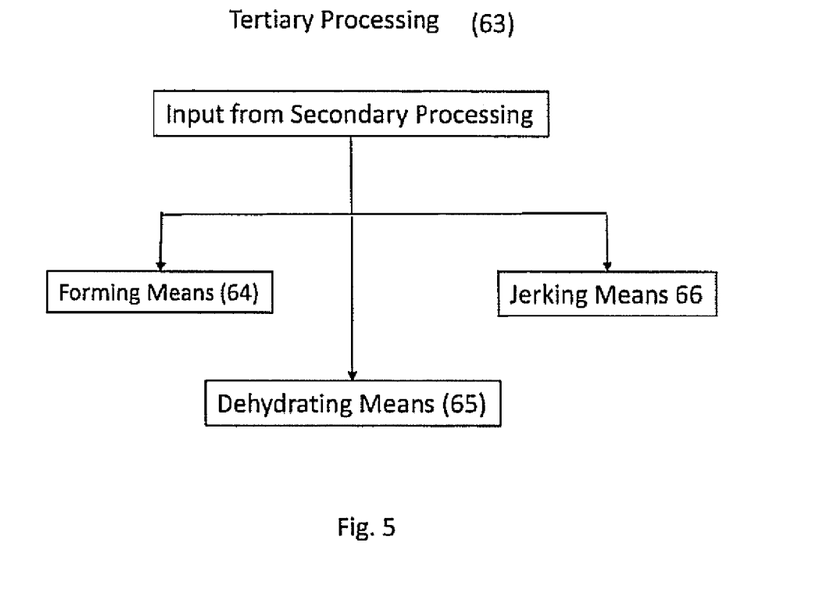
FIG. 5 is a schematic functional flow diagram of the tertiary processing facility of the present invention.

Preferably the processing system 50 also includes a tertiary processing facility 63 designed for processing edible trim collected from the secondary processing facility 58 into additional consumer products.

In an embodiment the tertiary processing facility 63 further may include a forming means 64 for chopping and forming the edible trim into patties, sticks or balls.

In a further embodiment the tertiary processing facility 63 further may include a dehydrating means 65 for dehydrating the edible trim.

In still a further embodiment the tertiary processing facility 63 further may include a jerking means 66 for converting edible trim, or processed fillets into jerky. The jerking means 66 may include brine tanks, smokers, or dryers for facilitating the jerking process.

Preferably the processing system 50 also includes a fish meal processing facility 70 designed for processing waste products collected from the primary processing facility 51 and the secondary facility into fish meal.

In an embodiment the fish meal processing facility 70 further may include a steam generation means 71 for generating steam. The steam is selectively directed into the waste product to separate fish oil from solids. The fish oil being collected as in input for animal feed or biodiesel. The solids being dehydrated and processed as fish meal.

The steam generation means 71 may be from the combustion or gasification of biomass, commercial or industrial wastes, or landfill wastes. The steam generation 71 means may be geothermal, or from conventional boilers.

In still a further embodiment waste heat from the stream generation means being directed to the at least one aquaculture grow-out module 20 for heating water used in the at least one grow-out module 20 through the use of a conventional heat exchanger or other similar method.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aquaculture system comprising:
   at least aquaculture grow-out module for containing an aquaculture species, each one of said at least one aquaculture grow-out modules being positioned within a structure;
   a feed handling system comprising a means for distributing feed to the aquaculture species located in said at least one aquaculture grow-out module;
   an aquaculture species moving system comprising a means for routing said aquaculture species at least out of said aquaculture grow-out module;
   a collocated processing system comprising a means for processing said aquaculture species after harvesting for said at least one aquaculture grow-out module;
   wherein said at least one aquaculture grow-out module further comprises:
   a plurality of holding tanks, each one of said plurality of holding tanks being for at least temporarily holding a quantity of production water and a quantity of the aquaculture species during the grow-out process;
   a treatment system operationally coupled to said plurality of holding tanks, said treatment system comprising a means for at least partially removing waste from said production water;
   wherein said quantity of the aquaculture species comprises a quantity of fish, and said quantity of fish held in at least one of said plurality of holding tanks is between 0.6 pounds of fish per gallon of production water to 6 pounds of fish per gallon of water, wherein the water quality, fish nutrition or fish health is not compromised;
   wherein said processing system further comprises a primary processing facility and a secondary processing facility;
   wherein said primary processing facility is operationally coupled to said aquaculture species moving system and comprises a means for receiving the aquaculture species in a live condition, said primary processing facility further comprising:
   at least one of a stunning means and a killing means for stunning or killing said aquaculture species prior to further processing;
   said primary processing facility producing a whole preprocessed aquaculture species or preprocessed aquaculture species carcass;
   wherein said secondary processing facility is operationally coupled to said primary processing facility and comprises a means for receiving a whole preprocessed aquaculture species or preprocessed aquaculture species carcass, said secondary processing facility further comprising a backbone removal means for removing the backbones of the aquaculture species, the removed backbones generally including some flesh, bones, and ribs.

2. The aquaculture system of claim 1, wherein the density of fish per gallon of water at least partially inhibits reproduction of the fish being held in said at least one of said plurality of holding tanks reducing the requirement to use hormones to inhibit reproduction.

3. The system of claim 1, further comprising an oxygen dissolving system for at least partially controlling a level of oxygen in said quantity of production water.

4. The system of claim 1, wherein said at least one aquaculture grow-out module further comprises 2 to 10 holding tanks.

5. The system of claim 1, further comprising a heating system operationally coupled to said at least one aquaculture grow-out module.

6. The system of claim 1, wherein each one of said plurality of holding tanks further comprises a central drain assembly positioned substantially in a center portion of each one of said plurality of holding tanks, said central drain assembly having a first portion adapted for draining waste in a predominately liquid form for direction into said treatment system, said central drain assembly having a second portion adapted for removing waste solids from said holding tank for direction into said treatment system.

7. The system of claim 6, wherein said treatment system directs waste from said plurality of holding tanks to a first pond wherein said waste is held in substantially aerobic conditions for use in fertigation.

8. The system of claim 6, wherein said treatment system removes a majority of carbon dioxide from said waste.

9. The system of claim 6, wherein said treatment system screens out a portion of waste solids and directs said waste solids to a holding pond to be used as fertilizer in a traditional land application.

10. The aquaculture system of claim 1, wherein said feed handling system further comprises:
    a feed pellet storage means for temporarily storing feed pellets to be fed to the aquaculture species; and
    a pellet delivery system for routing feed pellets from said feed pellet storage means to said at least one aquaculture grow-out module.

11. The aquaculture system of claim 10, further comprising:
    a grain storage means for selectively storing one or more grains for processing;

a grain processing facility for processing one or more grains and forming a quantity of feed pellets.

12. The aquaculture system of claim 11, wherein said grain processing facility further comprises a feed pellet extruder for forming a quantity of feed pellets into a selected size and shape.

13. The aquaculture system of claim 12, wherein said feed pellet extruder forming pellets with a diameter between 0.05 inches and 0.5 inches inclusive.

14. The aquaculture system of claim 13 wherein air is incorporated into said feed pellets after extrusion.

15. The aquaculture system of claim 12, wherein kelp is added to the processed one or more grains prior to extrusion.

16. The aquaculture system of claim 12, wherein crustaceans, bacteria, rotifers, or algae are added to the processed one or more grains prior to extrusion.

17. The aquaculture system of claim 12, wherein fish oil is applied to said feed pellets after extrusion.

18. The aquaculture system of claim 12, wherein vegetable or soybean oil is applied to said feed pellets after extrusion.

19. The aquaculture system of claim 12, further comprising:
   a dryer for drying a quantity of feed pellets after extrusion using thermal energy; and
   wherein waste thermal energy from said dryer is directed to said at least one grow-out module for heating water used in said at least one grow-out module.

20. The aquaculture system of claim 11 wherein the quantity of feed pellets comprises between 5 and 25 percent fat, between 25 and 50% protein, and the remainder carbohydrate and minerals.

21. The aquaculture system of claim 10, wherein said pellet delivery system utilizes a transport means selected from the group of transport means consisting of wheeled transport, chain, cable, and auger systems.

22. The aquaculture system of claim 1, further comprising:
   said primary processing facility further comprising a scaling means for selectively removing scales from the aquaculture species, the removed scales serving as an input to a fish meal processing facility;
   said primary processing facility further comprising a degutting means for removing guts from said aquaculture species, the removed guts serving as an input to said fish meal processing facility;
   said primary processing facility producing a whole preprocessed aquaculture species as an input to said secondary processing facility.

23. The aquaculture system of claim 22, wherein said primary processing facility further comprises:
   a deheading means for removing heads from said aquaculture species, the removed heads serving as an input to said fish meal processing facility;
   said primary processing facility producing a preprocessed aquaculture species carcass as an input to said secondary processing facility.

24. The aquaculture system of claim 1, further comprising:
   said primary processing facility further comprising a scaling means for selectively removing scales from the aquaculture species, the removed scales serving as an input to an industrial process;
   said primary processing facility further comprising a degutting means for removing guts from said aquaculture species, the removed guts serving as an input to said fish meal processing facility; and
   said primary processing facility producing a whole preprocessed aquaculture species as an input to said secondary processing facility.

25. The aquaculture system of claim 1, wherein said backbones serving as an input to a fish meal processing facility.

26. The aquaculture system of claim 25, wherein the flesh from the removed backbones is collected as edible trim for tertiary processing.

27. The aquaculture system of claim 25, further comprising a skinning means for selectively removing the skin of the preprocessed aquaculture species carcass, the removed skin serving as an input for said fish meal processing facility, for making gelatin, or for making leather.

28. The aquaculture system of claim 27, further comprising a filleting means for cutting fillets from said preprocessed aquaculture species carcass, wherein remaining flesh not part of the fillets is collected as edible trim for tertiary processing.

29. The aquaculture system of claim 27, further comprising a filleting means for cutting fillets from said preprocessed aquaculture species carcass, said fillets being directed tertiary processing.

30. The aquaculture system of claim 1, further comprising a tertiary processing facility adapted for processing edible trim collected from said secondary processing facility into additional consumer products.

31. The aquaculture system of claim 30, wherein said tertiary processing facility further comprises a forming means for chopping and forming said edible trim into patties, sticks or balls.

32. The aquaculture system of claim 30, wherein said tertiary processing facility further comprises a processing means for processing said edible trim into patties, sticks or balls.

33. The aquaculture system of claim 30, wherein said tertiary processing facility further comprises a dehydrating means for dehydrating said edible trim.

34. The aquaculture system of claim 30, wherein said tertiary processing facility further comprises a dehydrating means for dehydrating said whole preprocessed aquaculture species.

35. The aquaculture system of claim 30, wherein said tertiary processing facility further comprises a jerking means for processing said whole preprocessed aquaculture species or said edible trim into jerky.

36. The aquaculture system of claim 1, further comprising a tertiary processing facility adapted for processing edible trim collected from said primary processing facility and said secondary processing facility into additional consumer products.

37. The aquaculture system of claim 1, further comprising a fish meal processing facility adapted for processing waste products collected from said primary processing facility and said secondary facility into fish meal.

38. The aquaculture system of claim 37, wherein said fish meal processing facility further comprises:
   a steam generation means for generating steam;
   said steam being selectively directed into said waste product to separate fish oil from solids;
   said fish oil being collected as in input for animal feed or biodiesel;
   said solids being dehydrated and processed as fish meal; and
   wherein waste heat from said steam generation means being directed to said at least one aquaculture grow-out module for heating water used in said at least one grow-out module.

39. The aquaculture system of claim 1, further comprising:
   wherein said aquaculture species is a form of algae or aquatic plant life, and said feed comprises fertilizer or nutrients for said aquaculture species.

40. An aquaculture system comprising:

at least one aquaculture grow-out module for containing an aquaculture species, each one of said at least one aquaculture grow-out modules being positioned within a structure;

a feed handling system for distributing feed to the aquaculture species located in said at least one aquaculture grow-out module;

an aquaculture species moving system for routing said aquaculture species at least out of said aquaculture grow-out module;

a processing system for processing said aquaculture species after harvesting for said at least one aquaculture grow-out module;

wherein said at least one aquaculture grow-out module further comprises:

a plurality of holding tanks, each one of said plurality of holding tanks being for at least temporarily holding a quantity of production water and a quantity of the aquaculture species during the grow-out process;

a treatment system operationally coupled to said plurality of holding tanks, said treatment system at least partially removing waste from said production water;

wherein said quantity of the aquaculture species comprises a quantity of fish, and said quantity of fish held in at least one of said plurality of holding tanks is between 0.6 pounds of fish per gallon of production water to 6 pounds of fish per gallon of water, wherein the water quality, fish nutrition or fish health is not compromised;

wherein said treatment system directs waste from said plurality of holding tanks to a first pond wherein said waste in held in substantially aerobic conditions for use in fertigation;

wherein said treatment system removes a majority of carbon dioxide from said waste;

wherein said feed handling system further comprises:

a feed pellet storage means for temporarily storing feed pellets to be fed to the aquaculture species;

a pellet delivery system for routing feed pellets from said feed pellet storage means to said at least one aquaculture grow-out module;

a grain storage means for selectively storing one or more grains for processing;

a grain processing facility for processing one or more grains and forming a quantity of feed pellets;

a feed pellet extruder for forming a quantity of feed pellets into a selected size and shape, said feed pellet extruder forming pellets with a diameter between 0.05 inches and 0.5 inches inclusive;

wherein air is incorporated into said feed pellets after extrusion;

wherein the quantity of feed pellets comprises between 5 and 25 percent fat, between 25 and 50% protein, and the remainder carbohydrate and minerals;

a dryer for drying a quantity of feed pellets after extrusion using thermal energy;

wherein waste thermal energy from said dryer is directed to said at least one grow-out module for heating water used in said at least one grow-out module;

wherein said processing system further comprises a primary processing facility and a secondary processing facility;

wherein said primary processing facility is operationally coupled to said aquaculture species moving system for receiving the aquaculture species in a live condition, said primary processing facility further comprising:

a stunning means for stunning said aquaculture species prior to further processing;

a killing means for killing said aquaculture prior to further processing;

a scaling means for selectively removing scales from the aquaculture species, the removed scales serving as an input to a fish meal processing facility;

a degutting means for removing guts from said aquaculture species, the removed guts serving as an input to said fish meal processing facility;

a deheading means for removing heads from said aquaculture species, the removed heads serving as an input to said fish meal processing facility;

wherein said secondary processing facility is operationally coupled to said primary processing facility for receiving a whole preprocessed aquaculture species or preprocessed aquaculture species carcass, said secondary processing facility further comprising a backbone removal means for removing the backbones of the aquaculture species, the removed backbones generally including some flesh, bones, and ribs, said backbones serving as an input to a fish meal processing facility;

a tertiary processing facility adapted for processing edible trim collected from said primary processing facility and said secondary processing facility into additional consumer products;

wherein said fish meal processing facility further comprises:

a steam generation means for generating steam;

said steam being selectively directed into said waste product to separate fish oil from solids;

said fish oil being collected as in input for animal feed or biodiesel;

said solids being dehydrated and processed as fish meal; and wherein waste heat from said stream generation means being directed to said at least one aquaculture grow-out module for heating water used in said at least one grow-out module.

* * * * *